Figure 1:
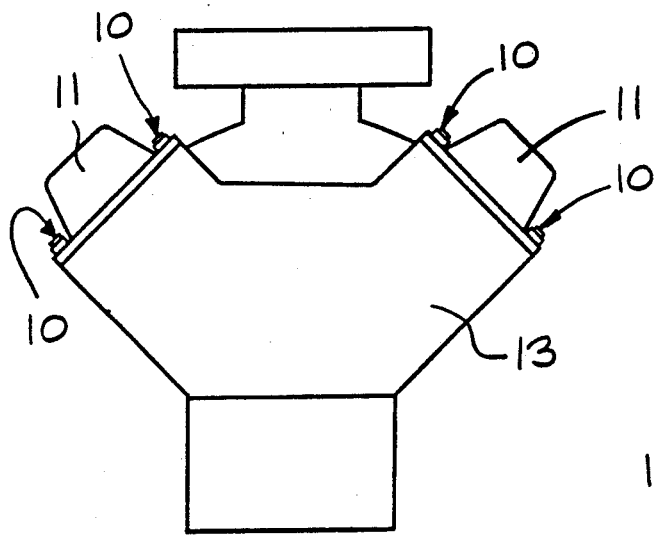

United States Patent [19]

Smith

[11] Patent Number: 5,020,951
[45] Date of Patent: Jun. 4, 1991

[54] FASTENER ASSEMBLY

[76] Inventor: David G. Smith, 917 N. Hickory St., Owosso, Mich. 48867

[21] Appl. No.: 593,063

[22] Filed: Oct. 5, 1990

[51] Int. Cl.$^5$ .............................................. F16B 39/00
[52] U.S. Cl. ..................................... 411/107; 411/133; 411/372; 411/533; 411/999
[58] Field of Search ................ 411/107, 368, 369, 370, 411/371, 372, 970, 999, 531, 533, 542, 544, 134, 148, 150, 149, 337, 424, 133, 134, 154

[56] References Cited

U.S. PATENT DOCUMENTS

| 3,126,935 | 3/1964 | Tuozzo . | |
|---|---|---|---|
| 3,202,033 | 8/1965 | Weidner, Jr. . | |
| 3,286,577 | 11/1966 | Weidner, Jr. . | |
| 3,422,721 | 1/1969 | Yonkers . | |
| 3,566,738 | 3/1971 | Cupit | 411/369 |
| 3,670,618 | 6/1972 | Jellison . | |
| 4,292,876 | 10/1981 | De Graan . | |
| 4,521,147 | 6/1985 | King, Jr. . | |
| 4,732,519 | 3/1988 | Wagner . | |

FOREIGN PATENT DOCUMENTS

| 1562269 | 2/1969 | France | 411/369 |
|---|---|---|---|
| 2359309 | 2/1978 | France | 411/337 |
| 892870 | 4/1962 | United Kingdom . | |

Primary Examiner—Rodney M. Lindsey
Attorney, Agent, or Firm—Ian C. McLeod

[57] ABSTRACT

An improved fastener assembly (10) for securing a rocker arm cover (11) to an engine block (13) is described. In the preferred embodiment, the fastener assembly is comprised of a bolt (15) with an unthreaded shaft (15b) between a head (15a) and a threaded end (15c) along a longitudinal axis of the bolt. The bolt is in a slideable relationship within a cylindrical opening (19a) through a grommet (19) and a secured washer (17). Projections or interference portions (15e) on the unthreaded shaft adjacent to the threaded section and opposite the head, restrict the axial movement of the bolt within the grommet and the washer. While the rocker arm cover is being alilgned on the engine block, the bolt is in an up position with the projecting surfaces adjacent to the washer. Once the rocker arm cover is aligned, the bolt is threadingly mated with a threaded aperture (13a) in the engine block. The amount of torque that can be applied to the bolt is controlled by a shoulder (15g) of the unthreaded shaft section contacting the engine block.

9 Claims, 3 Drawing Sheets

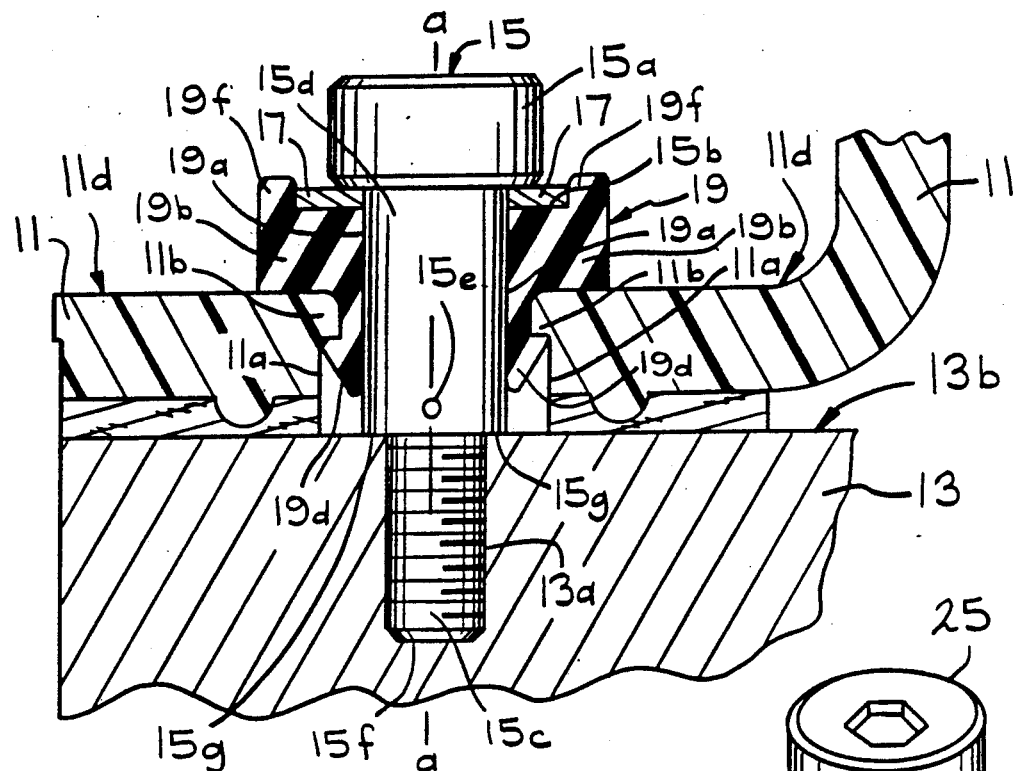
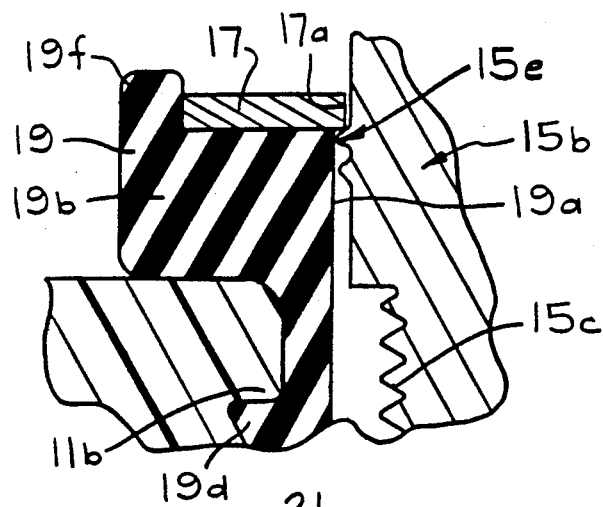
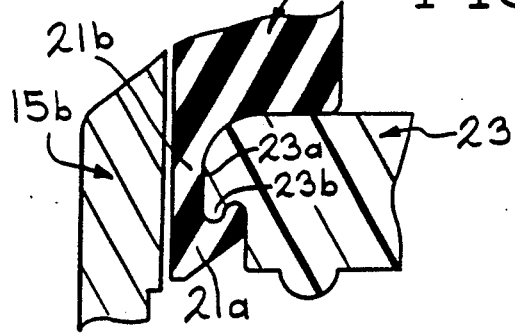
FIG. 4  FIG. 5  FIG. 6  FIG. 7

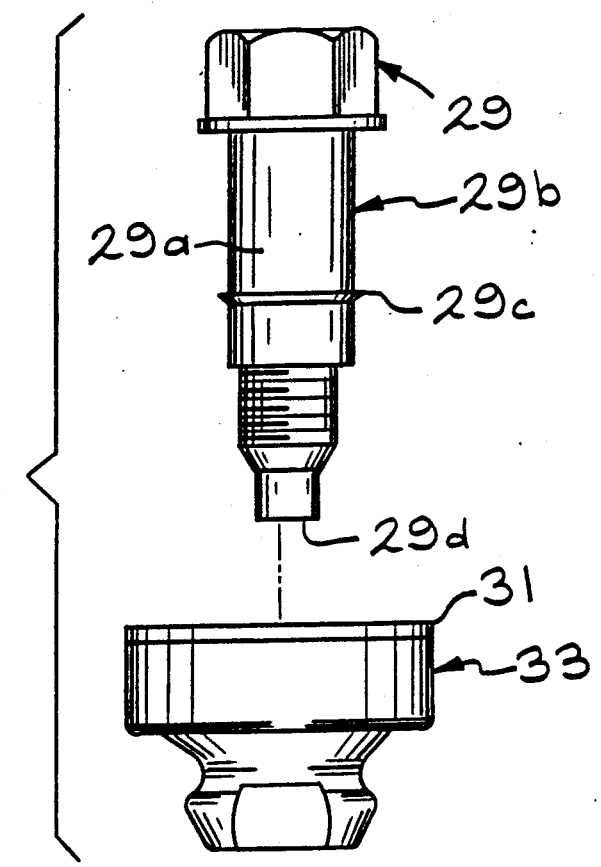
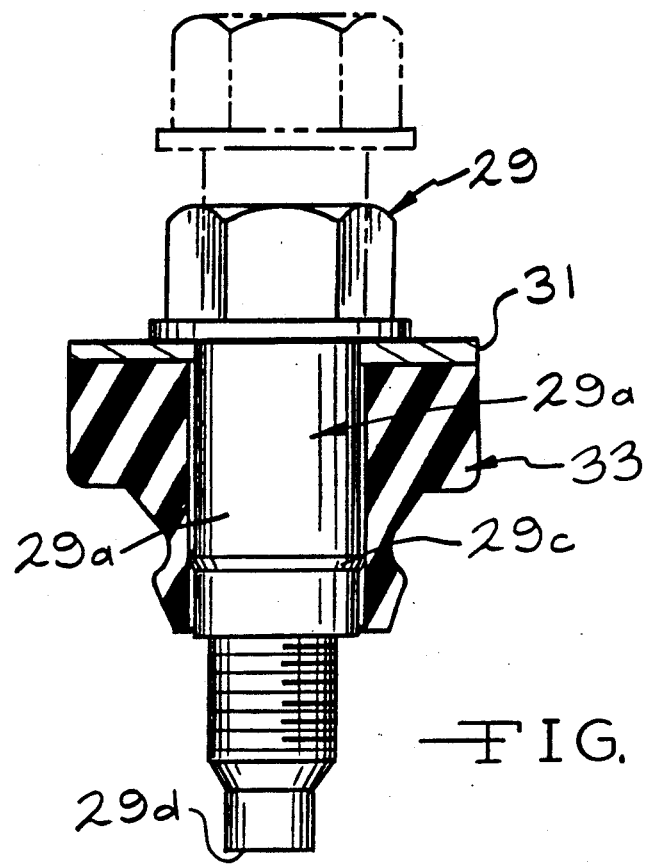

FASTENER ASSEMBLY

BACKGROUND OF THE INVENTION

(1) Field of the Invention

The present invention relates to an improved fastener assembly which is particularly useful for assembling a rocker arm cover to an engine block. In particular, the present invention relates to a three piece fastener assembly comprised of a bolt having a head and a partially threaded shaft that is mounted for axial movement inside of a rubber-like or elastic grommet with an intermediate washer secured to the grommet adjacent to the bolt head. The washer engages a stop means on a lower portion of the bolt between the head and the threaded end, to prevent removal of the bolt from the grommet and washer. During assembly, the fastener assembly is positioned in an opening in the rocker arm cover or the like with the bolt in a raised position so that it does not interfere with the alignment of the rocker arm cover on the engine block. The stop means keep the bolt from slideably releasing from the grommet and the washer while the bolt is in the raised position. Arrow tabs project from the grommet and lock under the rocker arm cover to retain the fastener assembly in the rocker arm cover opening or the like. After the rocker arm cover is aligned on the engine block, the bolt is threadingly mated with a threaded aperture in the block, the extent of which is controlled by an annular shoulder portion of an unthreaded section of the shaft of the bolt. When the bolt is threaded into the engine block, the grommet is compressed somewhat by the washer and serves to both muffle noise that is generated in the engine block and to prevent moisture and fluid from leaking into or out of the engine block.

(2) Prior Art

The prior art has described various types of screw fastener assemblies comprised of a bolt and a washer member for securing a first workpiece to a second workpiece. Most of the prior art devices are designed to seal a washer member mounted on an expandable and flexible gasket against a workpiece so that when a fastener member is tightened against the washer, the gasket is not deformed to the extent that the gasket no longer provides an effective means for sealing out moisture and liquid from the opening in the workpiece through which the fastener has been secured. Other devices provide for axial play between a fastening bolt and a washer, but have more parts and are more complicated than the present invention. These fastener assemblies are more expensive to manufacture and since fastener assemblies are manufactured by the millions, a reduction in manufacturing costs of a few cents translates into a substantial yearly savings. Illustrative of the prior art fastener devices are U.S. Pat. Nos. 3,126,935 to Tuozzo; 3,202,022 to Weidner, Jr.; 3,286,577 to Weidner, Jr.; 3,422,721 to Yonkers; 3,670,618 to Jellison; 4,292,876 to De Graan; 4,521,147 to King, Jr. et al; 4,732,519 to Wagner and British Patent No. 2,601,560 to McKee, Jr.

Tuozzo describes a retractable screw fastener having a stand-off bushing, a threaded fastener and a resilient gasket. The stand-off is assembled to one of two workpieces being joined by the use of a flaring tool. The threaded fastener is formed essentially in the shape of a bolt with a head at one end of a shaft and a threaded section at the other end. The threaded section is larger than the shaft so that when the threaded section is inserted into the resilient gasket, the fastener slides through an opening in the gasket, but is not able to slide back out. The shaft is free to slide inside the washer so that when the washer is inserted into the stand-off opposite the flared end, the shaft of the fastener is slid down the gasket and the threaded end is threadably mated to an aperture in the other of the two parts to be joined. This is a complex fastener assembly and requires more handling of the workpieces to be joined than in the present invention.

Weidner, Jr. describes two types of fastener assemblies. U.S. Pat. No. 3,202,033 describes a bonded washer having a backing member secured to a sealing member. The washer has a shoulder that is provided to control the driving and sealing action of the washer. U.S. Pat. No. 3,286,577 provides a stiff backing sealing member and a resilient sealing member which overcomes the problem of the sealing member flowing away from the opening in the first workpiece being joined to the second workpiece. Neither of the Weidner, Jr. fastener devices allow for axial play between a fastening bolt and the washer which are mounted together.

Yonkers describes a washer like member which provides for self-aligning and sealing of a bolt and nut or a similar fastening device. The member comprises an arcuate washer having a ring-shaped plastic filler joined to the concave side thereof which defines a generally convex arcuate outer surface for sealing on a workpiece and having a longitudinal axis without the bolt or nut being perpendicular to a plane defining the face of the workpiece. The washer is not secured to the bolt prior to mounting.

Jellison describes a composite washer having a dome-shaped metal member and a resilient member such as neoprene bonded to the metal member. The resilient member comprises two components, the first of which is bonded to the metal member along its bottom surface at the high portion of the dome and substantially adjacent a central opening. The second component is positioned in a partially overlapping relationship with the first component and is also bonded to the metal member along the bottom surface, radially removed from the washers central opening. The metal member is shaped to restrict the resilient member from moving radially outward and to urge a radially inward movement. The bolt is not secured to the washer prior to fastening.

De Graan describes an improved steel and neoprene bonded washer having a crowned steel washer with an inner elastomeric washer. The elastomeric washer is adjacent to the concave surface of the crowned washer. The steel washer has a generally flat outer ring and a conical portion extending from the outer ring toward the central opening. The angle of the sides of the conical portion is between 30° and 50° with respect to the flat portion. The bolt is not secured to the washer prior to fastening.

King, Jr. et al describes a blind fastener including an outer sleeve member, a stem, an inner sleeve member and a deformable washer which fits between the inner and outer sleeve members. The inner sleeve member is driven into the outer sleeve member from the accessible side of two workpieces while being supported on the stem so as to radially expand the outer sleeve member into interference fit with the hole. The deformable washer is placed between the head flanges on the inner and outer sleeve members and is sized so that the washer is deformed to expand the countersunk head flange on the outer sleeve member into interference fit with the countersink in the workpieces during the final driving movement of the inner sleeve member. After the inner sleeve member is driven into the outer sleeve member, the stem is pulled from the accessible side of the workpieces to form the blind head on the outer sleeve member on the blind side of the workpieces. The blind head former on the stem provides for grip adjustment by wire drawing or similar grip adjustment techniques normally used for blind fasteners so that the breakneck groove in the stem can be lined up with the head on sleeve member to allow the stem to be separated flush with the head. Because of the interference fit, locking grooves on the stem engage the inner sleeve member to mechanically lock the stem in position in the sleeve members. The bolt is not secured to the washer prior to fastening.

British Patent No. 892,870 to McKee, Jr. describes a fastener for securing corrugated and other forms of sheeting to the surface of building structures. Sealing washers are mounted on the washers and prevent moisture from entering through openings in the sheeting and the adjacent building structure member through which the shank of the fastener passes. The bolt is not secured by a metal washer to the fastener and the bolt is not axially moveable.

Wagner describes a fastener assembly that is adapted for use in connection with a first and a second apertured workpiece. The bolt is axially moveable in a washer but is designed to hold the bolt and washer together. The Wagner fastener assembly comprises a fastener, a washer and a rubber grommet. The washer has a depending sleeve portion on which the grommet is radially mounted. The fastener has a head and a shank with the shank having an intermediate unthreaded portion, a distal threaded portion and a pair of discrete protuberances or wings spaced apart on the unthreaded shank portion adjacent to the distal threaded shank portion for limiting the axial movement of the fastener along an opening through the sleeve portion of the washer. The sleeve also serves to limit the amount of torque that can be applied to the threaded shank portion when the fastener is used to join the two workpieces. The use of a sleeved washer as the torque limiting element and the use of annular wings on the unthreaded shank portion as the axial limiting element for the fastener in the sleeved washer, increases the cost of manufacturing the Wagner fastener assembly as compared to the present invention.

OBJECTS

It is therefore an object of the present invention to provide an improved fastener assembly for assembling a first workpiece to a second workpiece that comprises a grommet having a washer secured to one end of the grommet and an axially slideable fastener or bolt in a opening through the grommet and the washer wherein the bolt has a torque limiting shoulder on a shaft of the bolt. Further, it is an object of the present invention to provide an improved fastener assembly that eliminates the need for a torque limiting sleeve to be mounted on a bolt and projecting through an opening in the grommet. Further, it is an object of the present invention to provide a fastener assembly comprised of a grommet and a washer for limiting the axial movement of a fastener or bolt that is in slideable relationship with the grommet and the washer wherein the grommet does not latch over a washer sleeve or telescopically stretch over the washer in any fashion. Still further, it is an object of the present invention to provide an improved fastener assembly that is simple to make and inexpensive to build and which can be preferably assembled from parts commonly found in industry. These and other objects will become increasingly apparent by reference to the following descriptions and to the drawings.

IN THE DRAWINGS

FIG. 1 is a front end schematic view of an engine block 13 with two rocker arm covers 11 secured to the engine block 13 by a plurality of fastener assemblies 10.

Figure 2:
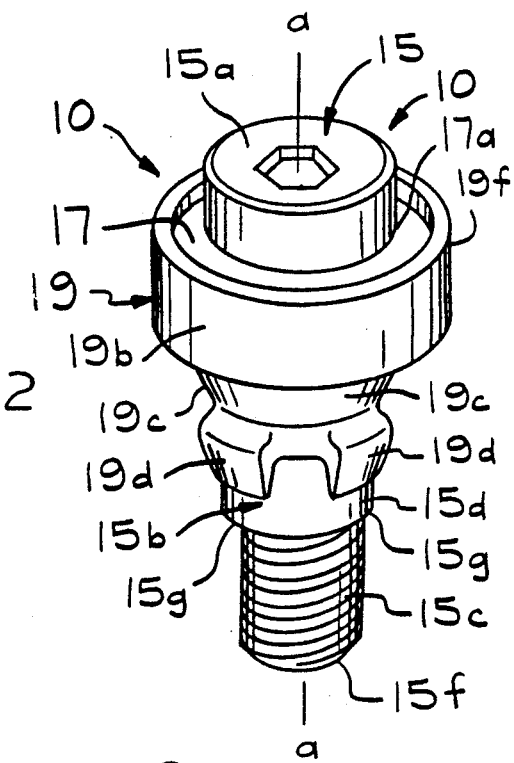

FIG. 2 is an isometric perspective view of the fastener assembly 10 particularly showing a bolt 15 comprised of a threaded section 15c, a head 15a opposite the threaded section 15c, an intermediate shaft 15b, and a washer 17 secured to the top of a grommet 19.

Figure 3:
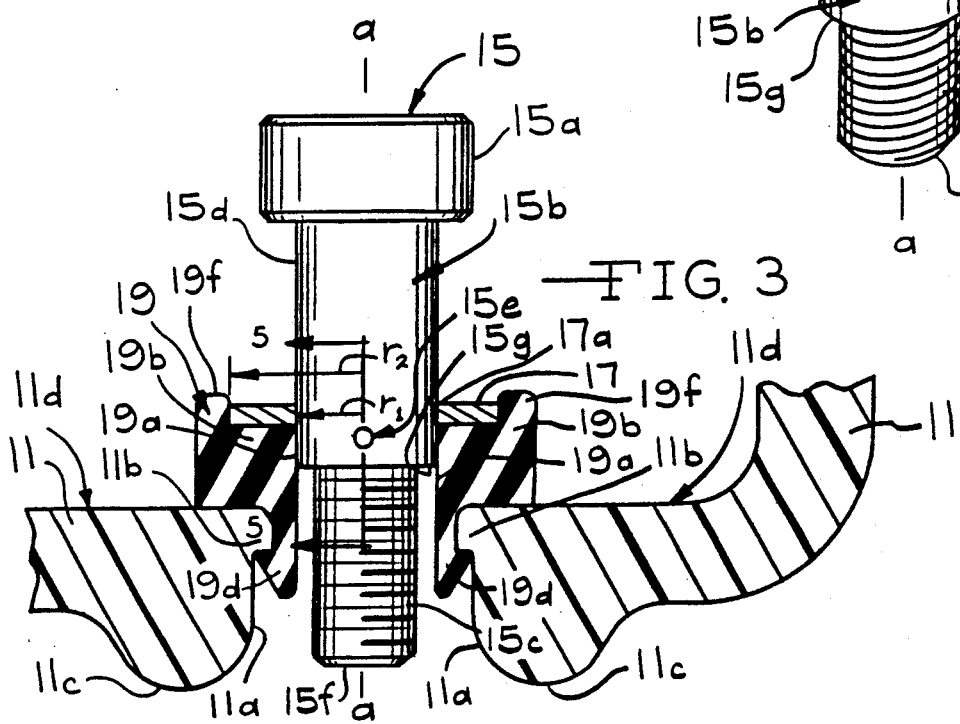

FIG. 3 is a front cross-sectional view of the fastener assembly 10 showing the bolt 15 in a raised position with protrusions 15e contacting the washer 17 and limiting the axial movement of the bolt 15 in the grommet 19 and showing arrow tabs 19d projecting from the grommet 19 and engaging corresponding arrow locking members 11b on the rocker arm cover 11.

FIG. 4 is a front cross-sectional view of the fastener assembly 10 securing a rocker arm cover 11 to an engine block 13 with a shoulder 15g of the intermediate section 15a of the bolt 15 limiting the depth of penetration of the bolt 15.

FIG. 5 is a partial enlarged front cross-sectional view along line 5—5 of FIG. 3 showing the protrusions 15e on bolt 15 limiting the axial movement of the bolt 15 in the washer 17.

FIG. 6 is a partial enlarged cross-sectional view of a grommet 21 with hook tabs 21a engaging a corresponding hook locking member 23b of a rocker arm cover 23.

FIG. 7 is a separated perspective view of a shaft 25b of a bolt 25 with a groove 25c that snappingly receives a washer 27 with tabs 27a for limiting the axial movement of the bolt 25 in the washer 27.

FIG. 8 is a separated perspective view of a bolt 29 with an annular stop ring 29c on a shaft 29b that moves through a washer 31 secured to a grommet 33 for limiting the axial movement of the bolt 29 in the washer 31 and grommet 19.

FIG. 9 is a front partial cross-sectional view of the bolt 29 with stop ring 29b mated with washer 31 and grommet 19 in a lowered position (solid lines) and a raised position (dotted lines).

GENERAL DESCRIPTION

Further, the present invention relates to a fastener assembly for fastening a member with a hole for the assembly to a support with a threaded opening which comprises: bolt means having a head at one end, an intermediate shaft and a threaded portion at an opposite end from the one end along a longitudinal axis, wherein the shaft has a larger cross-section adjacent the threaded portion which engages an entrance to the threaded opening upon assembly; a flexible grommet means having an opening which receives the shaft of the bolt means, wherein the bolt means is moveable in the opening in the grommet means along the longitudinal axis so that the threaded portion projects from the grommet when the assembly is fastened into the threaded opening and the threaded portion can be positioned inside the grommet means prior to fastening; and flat washer means mounted around the shaft means and secured to the grommet means, wherein the bolt means and the washer means have interference portions which engage each other so that the grommet means can move axially on the bolt means until the interference portions engage each other with the threaded portion at least partially inside the grommet means.

Furthermore, the present invention relates to a fastener assembly for fastening a member with a hole for the assembly to a support with a threaded opening which comprises: bolt means having a head at one end, an intermediate shaft and a threaded portion at an opposite end from the one end along a longitudinal axis, wherein the shaft has a larger cross-section adjacent the threaded portion which engages an entrance to the threaded opening upon assembly; a flexible grommet means having an opening which receives the shaft of the bolt means wherein the bolt means is moveable in the opening in the grommet means along the longitudinal axis so that the threaded portion projects from the grommet when the assembly is fastened into the threaded opening and the threaded portion can be positioned inside the grommet means prior to fastening; and flat washer means mounted around the shaft means and secured to the grommet means, wherein the bolt means is provided with a projection on the shaft which contacts the washer means so that the grommet means can move axially on the bolt means until the projection is in interference with the washer means and the threaded portion is at least partially inside the grommet means.

The washer and bolt are usually made of steel, but can be of any material with sufficient strength for the application. The grommet is usually rubber having a durometer of between about 35 and 85, preferably 65.

SPECIFIC DESCRIPTION

FIGS. 1 to 9 show the preferred embodiment of an improved fastener assembly 10 for securing a rocker arm cover 11 to an engine block 13. As shown more clearly in FIGS. 3 and 4, the fastener assembly 10 comprises a bolt 15 having a longitudinal axis a—a, the bolt 15 projecting through an opening 17a in a washer 17 and through a cylindrical opening 19a in a grommet 19 made of rubber or other suitable elastic material. The bolt 15 provides for a head 15a at one end of a shaft 15b. The shaft 15b has a cylindrical cross-section along the axis a—a with a threaded section 15c opposite the head 15a and an intermediate unthreaded section 15d that is radially larger than the threaded section 15c. As shown in FIGS. 3, 4, and 5, the shaft 15b is provided with projections or interference portions 15e that are peened into the shaft 15b at a predetermined point spaced from the head 15a and adjacent to the threaded section 15c.

The washer 17 is provided around the shaft 15b and is disc shaped with an inner radius $r_1$ and an outer radius $r_2$ projecting from the axis a—a (FIG. 3). The inner radius $r_1$ is slightly larger than the radial extent of the shaft 15b around the axis a—a, but slightly smaller than the radius of the projections 15e from the axis a—a (FIG. 5). This allows for axial movement of the unthreaded section 15d of the bolt 15 between the head 15a and the projections 15e along the washer 17 and the grommet 19. Preferably, three of these projections 15e are provided with the projections 15e spaced substantially 120 degrees apart around the axis a—a. The axial play of the bolt 15 along the washer 17 is required so that the bolt 15 does not interfere with the alignment of a first workpiece or rocker arm cover 11 with a second workpiece or engine block 13. In addition, the projecting stop surfaces 15e provide for increased lateral play for the head 15a of the bolt 15 and for relative tilting between the bolt 15 and the grommet 19 for facilitating alignment of the bolt 15 with a threaded aperture 13a in the engine block 13. This is particularly helpful in assemblies involving a plurality of fastener assemblies 10 such as the assembly of the rocker arm cover 11 to the engine block 13.

As shown in FIG. 2, the rubber of elastic grommet 19 comprises an annular flange 19b and a radially extending tapered section 19c around the cylindrical opening 19a (FIG. 3) which has a longitudinal axis corresponding to the axis a—a. The tapered section 19c has a frusto-conical shape that inclines downwardly and inwardly toward the axis a—a from the flange 19b to three projecting fingers (only two shown) or arrow tabs 19d spaced uniformly around the circumference of the tapered section 19c and the axis a—a. The arrow tabs 19d engage corresponding arrow locking members 11b on the rocker arm cover 11 and are the preferred embodiment to secure the grommet 19 in the opening 11a for mounting the fastener assembly 10. An annular rim section 19f extends from the outer periphery of the annular flange 19b and provides for the washer 17 which is secured to the grommet 19 during manufacturing so that the washer 17 is within perimeter of the annular rim section 19f. A lip (not shown) over the top of the washer might also be used. Besides acting as a compression gasket when the rocker arm cover 11 is bolted to the engine block 13, the grommet 19 also muffles noise created in the engine block 13 which might be transmitted to the rocker arm cover 11.

Another embodiment of the locking mechanism between a grommet 21 and a rocker arm cover 23 is shown in FIG. 6. As is the case with the arrow tabs 19d, three projecting fingers or hook tabs 21a extend from a tapered section 21b, and are spaced uniformly around the circumference of the tapered section 21b, substantially 120 degrees apart similarly to the arrow tabs 19d on the grommet 19. The grommet 21 is inserted through an opening 23a in the rocker arm cover 23 with the hook tabs 21a engaging corresponding hook locking members 23b, to secure the grommet 21 to the rocker arm cover 23.

FIG. 7 shows another embodiment of the present invention where an unthreaded section 25a of a shaft 25b of a bolt 25 is provided with two grooves 25c (only one shown) that run substantially the length of the unthreaded section 25a from a head 25d to a threaded section 25e. A washer 27 is provided with two locating tabs 27a that are located the inner radius $r_1$ of the washer 27 corresponding to the grooves 25c in the shaft 25b. The washer 27 is then preassembled with the bolt 25 by telescopically associating one with the other and snappingly forcing the locating tabs 27a of the washer 27 over the shaft 25b of the bolt 25 to secure the locating tabs 27a into grooves 25c. The number and positioning of the grooves 25c and the locating tabs 27a is not critical as long as there are a sufficient number of corresponding grooves 25c for the locating tabs 27a to provide an interference means between the washer 27 and the unthreaded section 25a of the shaft 25b of the bolt 25.

FIGS. 8 and 9 shows still another embodiment of the present invention where an unthreaded section 29a of a shaft 29b of a bolt 29 is provided with an annular stop ring 29c that snappingly mates with a washer 31 in a similar manner as the embodiment described above in FIG. 7. FIG. 9 shows the bolt 29 in both a lowered position (solid lines) and a raised position (dotted lines). The annular stop ring 29c limits the extent to which the bolt 29 can be raised in a grommet 33, which is similar to the grommet 19, during alignment of the rocker arm cover 11 with the engine block 13. With the bolt 29 at its upper extent in the raised position (dotted lines), the annular stop ring 29c contacts the washer 31 so that the end 29d of the shaft 29a is clear of the end 11c of the rocker arm cover 11 as shown in FIG. 3 with the bolt 15. This keeps the bolt 29 from interfering with the alignment process.

Other variations of the interference means between the bolts 15, 25 and 29 and the washers 17, 27 and 31 will occur to those skilled in the art. It is conceivable that the projections 15e (FIGS. 3, 4 and 5) could also be formed by spot welding the shaft 15b or by a drop forging process when the bolt 15 is made.

The preferred method of operation is shown in FIGS. 3 and 4. The bolt 15, washer 17 and grommet 19 are first preassembled as shown in FIG. 2. The three piece fastener assembly 10 is then placed into the opening 11a through the rocker arm cover 11 with the annular flange 19b of the grommet 19 flush against the upper surface 11d of the rocker arm cover 11. The arrow tabs 19d fit inside of the opening 11a in the rocker arm cover 11 and snap into the arrow locking members 11b of the rocker arm cover 11. In preparation for the alignment process, two rocker arm covers 11 (FIG. 1) are preassembled with a plurality of fastener assemblies 10 mounted through opening 11a in the rocker arm cover 11. The bolts 15 are then extended in a raised position with the protrusions 15e contacting the washer 17 and with the end 15f of the bolts 15 clear of the bottom side 11c of the rocker arm cover 11 so that the bolts 15 do not interfere with the alignment process. The two rocker arm covers 11 are then placed on the engine block 13, awaiting final assembly.

As shown in FIG. 4, the radial extent of the shoulder 15g of the shaft 15b of the bolt 15 is larger from the axis a—a than that of the aperture 13a in the engine block 13. Therefore, the extent to which the threaded section 15c of the bolt 15 will advance into the threaded aperture 13a of the engine block 13 is controlled by the shoulder 15g contacting the upper surface 13b of the engine block 13. During final assembly, the threaded section 15c of the bolt 15 is advanced into and threadedly mated with the threaded aperture 13a until the shoulder 15g contacts the upper surface 13b of the engine block 13. This operation causes the head 15a of the bolt 15 to contact the washer 17, preferably compressing the grommet 19 somewhat so that the annular flange 19b of the grommet 19 forms a fluid seal in the opening 11a through the rocker arm cover 11 which serves to both muffle noise that is generated in the engine block 13 and to prevent moisture and fluid from leaking into or out of the engine block 13.

It is intended that the foregoing description be only illustrative of the present invention and that the present invention be limited only by the hereinafter appended claims.

I claim:

1. A fastener assembly for fastening a member with a hole for the assembly to a support with a threaded opening which comprises:
   (a) bolt means having a head at one end, an intermediate shaft and a threaded portion at an opposite end from the one end along a longitudinal axis, wherein the shaft has a larger cross-section adjacent the threaded portion which engages an entrance to the threaded opening upon assembly;
   (b) a flexible grommet means having an opening which receives the shaft of the bolt means, wherein the bolt means is moveable in the opening in the grommet means along the longitudinal axis so that the threaded portion projects from the grommet when the assembly is fastened into the threaded opening and the threaded portion can be positioned inside the grommet means prior to fastening; and
   (c) flat washer means mounted around the shaft means and secured to the grommet means, wherein the bolt means and the washer means have interference portions which engage each other so that the grommet means can move axially on the bolt means until the interference portions engage each other with the threaded portion at least partially inside the grommet means.

2. The assembly of claim 1 wherein the washer means has a projection which engages a slot in the unthreaded portion of the shaft means.

3. A fastener assembly for fastening a member with a hole for the assembly to a support with a threaded opening which comprises:
   (a) bolt means having a head at one end, an intermediate shaft and a threaded portion at an opposite end from the one end along a longitudinal axis, wherein the shaft has a larger cross-section adjacent the threaded portion which engages an entrance to the threaded opening upon assembly;
   (b) a flexible grommet means having an opening which receives the shaft of the bolt means wherein the bolt means is moveable in the opening in the grommet means along the longitudinal axis so that the threaded portion projects from the grommet when the assembly is fastened into the threaded opening and the threaded portion can be positioned inside the grommet means prior to fastening; and
   (c) flat washer means mounted around the shaft means and secured to the grommet means, wherein the bolt means is provided with a projection on the shaft which contacts the washer means so that the grommet means can move axially on the bolt means until the projection is in interference with the washer means and the threaded portion is at least partially inside the grommet means.

4. The assembly of claim 3 wherein the washer means is secured in a recess in the grommet means.

5. The assembly of claim 3 wherein the washer means is disc shaped.

6. The assembly of claim 3 wherein the grommet means is provided with a retainer means which fits into the hole in the member to be joined to the support by the bolt means.

7. The assembly of claim 6 wherein the member is a rocker arm cover and the support is a rocker arm cover support on an engine.

8. The assembly of claim 6 wherein the retainer means are projecting fingers around the axis of the grommet means which are inserted into the hole in the member to hold the grommet in place in the hole.

9. The assembly of claim 3 wherein the projection is an upset portion on the shaft of the bolt which is in interferance with the washer.

* * * * *